Figures 1, 2, 3:
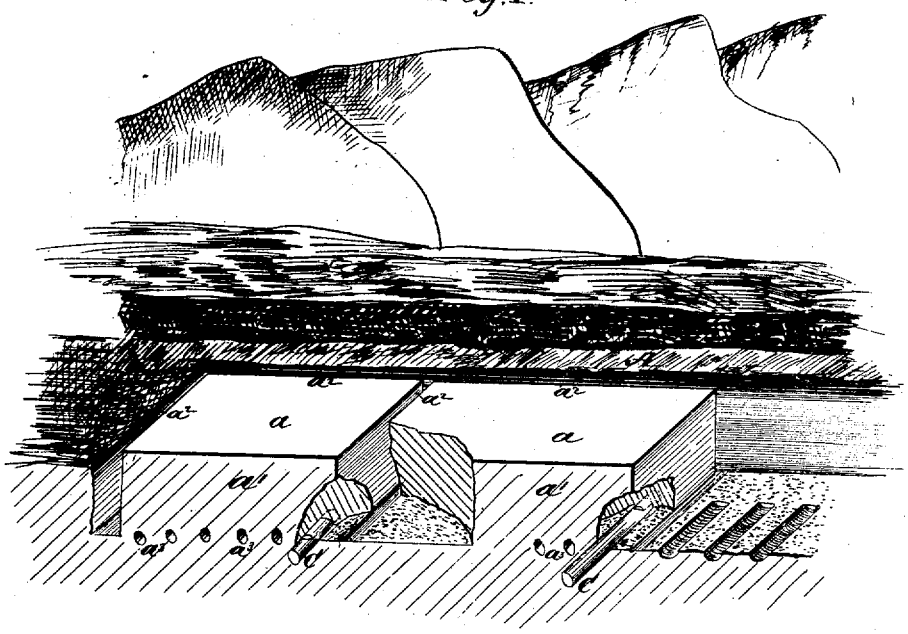

P. CROGHAN.

Methods of Splitting Stone.

No. 5,842. Reissued April 21, 1874.

WITNESSES:

G. Mathys

Solon C. Kemon

INVENTOR:

Patrick Croghan

BY Munn & Co.

ATTORNEYS.

UNITED STATES PATENT OFFICE.

PATRICK CROGHAN, OF COCKEYSVILLE, MARYLAND.

IMPROVEMENT IN METHODS OF SPLITTING STONE.

Specification forming part of Letters Patent No. 140,681, dated July 8, 1873; reissue No. 5,842, dated April 21, 1874; application filed April 10, 1874.

*To all whom it may concern:*

Be it known that I, PATRICK CROGHAN, of Cockeysville, in the county of Baltimore and the State of Maryland, have invented a new and Improved Mode of Splitting Rock; and I do hereby declare the following to be a full, clear, and exact description of the same, reference being had to the accompanying drawing, forming part of this specification, in which—

Figure 1 is a perspective view, partly broken away; and Figs. 2 and 3, detail views.

The invention relates to methods of splitting off blocks from rocks in a quarry, after the same have been leveled on the top and front faces, and channeled out at the ends and back.

It will first be described in connection with all that is necessary to a full understanding thereof, and then clearly pointed out in the claim.

In the drawing, A represents a rock from which is to be obtained blocks for building and other purposes, and $a$ $a^1$ two faces which have been leveled off at the requisite angle to each other. $a^2$ is a cut made parallel to the face $a^1$ with a suitable channeling-machine. $a^3$ is a series of holes made in a plane parallel to the face $a$, and on a plane in which it is the object to split off these blocks. The old method of doing this consisted in placing tapering side pieces, round on the outside and plane on the inside face, in each of the edge holes $a^3$, and then driving between them a wedge. By driving one wedge after the other in succession, the block is expected to be rived in the proper plane; but, in fact, it quite frequently happens otherwise. A line of split oblique to the desired plane is often the result. The effect of this is to leave the top of the subjacent block with an awkward projection, which can only be removed at the expense of much labor and time. Of course, these oblique splits occur at slightly different angles. After much thought and experiment on the subject, I have found that the difficulty arises from the wedge-pressure being exerted on the edge of the plane of split. Hence I bore the holes $a^3$, as shown in Fig. 1 of drawing, so as to extend, preferably, beyond the longitudinal median line of stone, and place the tapering side pieces B B beyond the edges and well on the inside of the holes $a^3$. I then provide the wedge C with a suitable length of shank, so that it can reach and be conveniently driven between the side pieces B B. This enables me to cause a separation nearly or quite on the exact plane required. I have verified this by numerous experiments in the presence of experts, who all acknowledge the advantage and marked benefit arising from my new method of splitting off blocks.

Having thus described my invention, what I claim as new, and desire to secure by Letters Patent, is—

The method of splitting blocks from rocks, after the tops and fronts have been leveled, as well as the ends and back channeled out, by placing the pieces B B some distance within the edge of holes $a^3$, and inserting the wedges C between said pieces, as and for the purpose set forth.

PATRICK CROGHAN.

Witnesses:

THOMAS O'HARA,
MARTIN O'HARA.